United States Patent [19]

Meyerle

[11] 4,395,594
[45] Jul. 26, 1983

[54] METHOD AND APPARATUS FOR FORCING RANDOMIZATION OF IDLE CHANNEL SEIZURES

[75] Inventor: John A. Meyerle, Manasquan, N.J.

[73] Assignee: Bell Telephone Laboratories, Incorporated, Murray Hill, N.J.

[21] Appl. No.: 295,858

[22] Filed: Aug. 24, 1981

[51] Int. Cl.³ .................................................. H04M 11/00
[52] U.S. Cl. ...................................... 179/2 EB; 455/34
[58] Field of Search ............... 179/2 E, 2 EB; 455/34, 455/54, 56, 58, 62; 370/85, 95; 340/825.5, 825.44

[56] References Cited

U.S. PATENT DOCUMENTS

| | | |
|---|---|---|
| 2,616,032 | 10/1952 | Herrick . |
| 3,377,435 | 4/1968 | Lippert . |
| 3,513,264 | 5/1970 | Baer ............................ 179/2 EB X |
| 4,028,500 | 6/1977 | McClure et al. . |
| 4,103,106 | 7/1978 | Sechan ............................. 179/2 EB |
| 4,319,222 | 3/1982 | Davis et al. ....................... 340/825.5 |

OTHER PUBLICATIONS

Bell System Technical Journal, vol. 58, No. 1, Jan. 1979, "Advanced Mobile Phone Service: Control Architecture," Z. C. Fluhr et al., pp. 43, 47–55.

Primary Examiner—G. Z. Rubinson
Assistant Examiner—W. J. Brady
Attorney, Agent, or Firm—C. S. Phelan

[57] ABSTRACT

A base station (14) in an idle channel marked mobile radiotelephone system is provided with means (26, 27) for inhibiting station removal of idle marking tone from a channel for a time interval $\tau_{RD}$ of randomly selectable duration following initiation of the tone on the channel. That inhibit interval forces mobile units using so-called instant channel grabbers at idle tone initiation time to operate through at least two full executions of the normal access-requesting tone program, thereby providing an opportunity for a mobile unit using a random-delay seizure algorithm to access the channel between or during the executions of the instant channel grabber mobile unit.

6 Claims, 5 Drawing Figures

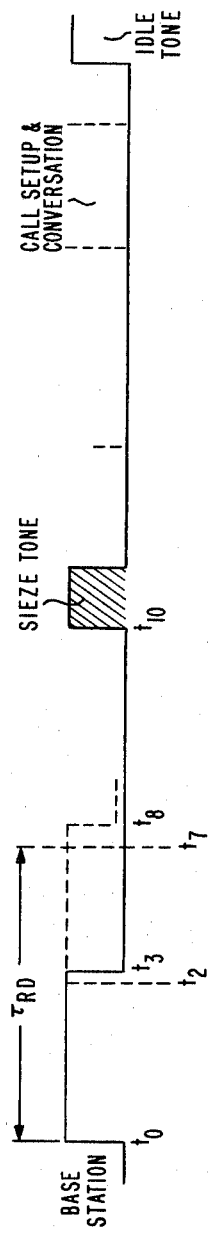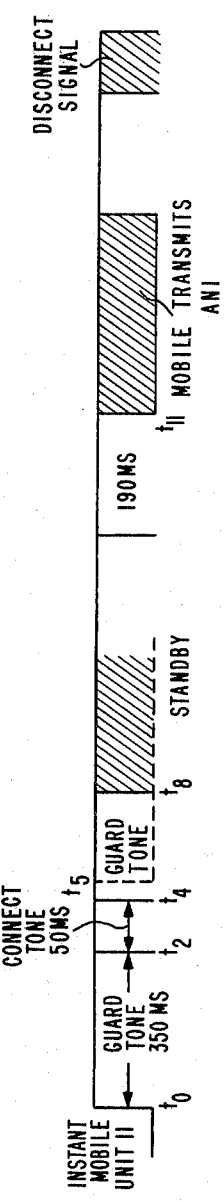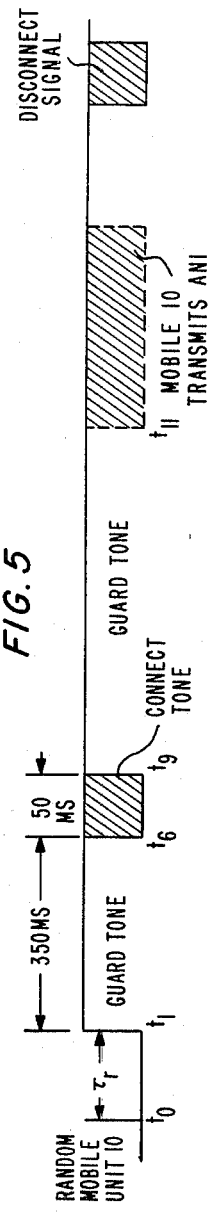

METHOD AND APPARATUS FOR FORCING RANDOMIZATION OF IDLE CHANNEL SEIZURES

BACKGROUND OF THE INVENTION

This invention relates to communication systems employing a communication channel which is shared among plural system users. More particularly, the invention relates to a technique for user equipment seizure of the channel on a reasonably equitable opportunity basis.

As used herein, the term "channel" has reference to both simplex and duplex channels and includes, as well, any of wire, radio, or other signal transmission media.

For convenience of discussion, and without limitation, the invention is herein considered in terms of its application in a mobile radiotelephone communication system. In like manner, the term "mobile unit" which will be used in the consideration, refers to a movable radio transmitting and receiving unit, regardless of whether the unit is carried by vehicular, human, or other means, and whether or not the mobility is in a terrestrial environment.

Various techniques have been used in the art for gaining access to shared communication channels. The R. H. Herrick U.S. Pat. No. 2,616,032 teaches a camp-on busy technique in which a mobile unit simply stays tuned to a desired channel that happens to be busy. The unit user activates a circuit to monitor base station transmitted carrier; and when it goes off the air, the unit transmitter is automatically turned on to seize the channel.

The U.S. Pat. No. 3,513,264 of J. Baer relates to a communication satellite system in which a routing center receives call requests, assigns specific channels to each call, and thereby avoids the problem of seizure attempt collisions in which plural mobile units simultaneously try to gain access to a shared channel.

U.S. Pat. No. 3,377,435 to A. H. Lippert teaches an idle channel marking communication system in which, for example, a predetermined tone is transmitted on the shared channel when it is available for message transmission. Mobile units sharing the channel and detecting the idle marking tone lock to the channel automatically to await either an incoming paging message or an indication by the unit user that it is necessary to initiate an outgoing call. In the latter case, a particular program, or sequence, of tones is transmitted in order to seize the idle channel for the exclusive use of a single unit; and such a program is shown, for example, in FIG. 7 of the patent. If plural units, of approximately equal received signal strength at a system base station, attempt simultaneously to seize the channel, their respective automatic number identification (ANI) sequences cause garbling; and the system control terminal requires all such plural units to retry.

It has been found that it is possible for automatic equipment of multiple subscribers to come into near simultaneous contention for a shared channel with the result that seizure collisions occur recurrently, and none of the contending units actually gains access to the channel. Thus, the channel is, in effect, blocked even though it is not actually in use. The impact of this possibility has been reduced, to a certain extent, by building some measure of randomization into mobile unit automatic channel seizure algorithms as taught, for example, by Z. C. Fluhr and P. T. Porter in "Advanced Mobile Phone Service: Control Architecture," Vol. 58, No. 1, January 1979, *Bell System Technical Journal*, at P. 55, and in columns 20-23 of the G. F. McClure et al. U.S. Pat. No. 4,028,500. However, some mobile unit users in radiotelephone systems which are designed for randomized seizure algorithms have gained an apparent grade-of-service advantage by employing automatic circuits, sometimes called "instantaneous channel-grabbers," to seize a channel almost as soon as idle marking tone is detected on the channel. An example of such a circuit is shown in the C. J. Sechan U.S. Pat. No. 4,103,106.

SUMMARY OF THE INVENTION

A more equitable opportunity for access to a shared communication channel by all contending users is provided by modifying channel access controlling circuits in a base station to be nonresponsive to access-request signals for a variable time interval after the station initiates the marking of the channel to indicate its availability for message transmission. User equipment sending an access-request signal in that interval fails to achieve access and reinitiates its accessing program, thereby becoming randomized to that extent, whether or not the equipment actually otherwise uses a random accessing algorithm.

BRIEF DESCRIPTION OF THE DRAWING

A more complete understanding of the invention and the various features, objects, and advantages thereof can be obtained from a consideration of the following Detailed Description and the appended claims in connection with the drawing in which:

FIGS. 3, 4, and 5 are timing sequence diagrams illustrating operation of the invention.

DETAILED DESCRIPTION

Figure 1:
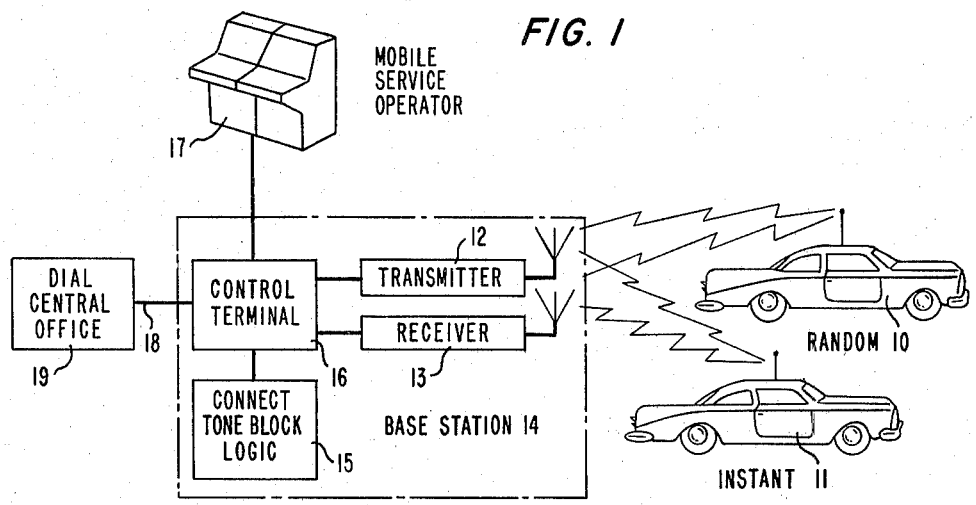
FIG. 1 is a simplified block and line diagram of a mobile radiotelephone system utilizing the invention.

In FIG. 1, a multiplicity of mobile units, such as the two units 10 and 11 actually illustrated, each includes a known supervisory and control unit for enabling selective call communication cooperation between the mobile unit and a transmitter 12 and a receiver 13 of a shared access communication channel. That channel is provided through a fixed station, i.e., a base station 14, which includes that transmitter and receiver, as well as a control terminal 16. Associated with that terminal, either in the fixed station or at another location, is a mobile service operator position console 17 to permit the interception of call signals of types which may be beyond the capabilities of automatic call handling equipment in the control terminal 16. The fixed base station 14 is coupled through a trunk circuit 18 to a dial central office 19 in the public switched telephone network. If the system employs multiple radio channels, plural trunk circuits would also be provided to office 19. This description is, however, directed, without limitation, to a system with a single shared-access channel because that is the environment in which there is the greatest need to assure randomization of all channel seizure attempts. The invention is also useful in systems having plural radio channels served by one control terminal.

It is assumed, for the purposes of the present description, that the mobile unit 10 operates in accordance with one of the known random time delay algorithms for gaining access to the shared channel and that the mobile unit 11 operates in accordance with an instantaneous channel seizing algorithm of the type hereinbefore outlined. In one of the random time delay algorithms, for example, if at the time a mobile unit user goes off-hook to initiate a call, the unit is not locked to an idle channel, the unit enters a routine in which it selects a random interval duration. The unit then waits out the corresponding delay prior to initiating a predetermined program of signals for seizing the channel when it is thereafter marked with idle tone. In one typical mobile radiotelephone system, the accessing tone program in the mobile unit begins with 350 milliseconds of guard tone at a first frequency to alert the control terminal that a seizure attempt is being initiated so that the necessary control terminal circuits can be appropriately conditioned. Next, the program typically includes 50 milliseconds of connect tone at a second predetermined frequency, and recognition of the connect tone at the control terminal causes that terminal to terminate the idle marking tone. In a typical system, detection of the removal of the marking idle tone during the transmission of connect tone indicates to the mobile unit that the control terminal will proceed with the remainder of the normal system algorithm for setting up the call.

In the instant-seizure algorithm employed in mobile unit 11, the process is similar to the random process just described, except that the steps of selecting a random time delay and waiting out its expiration are replaced by a step in which the unit cyclically rechecks for receiver lock to an idle marked channel. The cyclic period is substantially shorter than the access signal program duration. When a recheck shows that the receiver is locked to an idle marked channel, the unit initiates the program of signals for seizing the channel.

Figure 2:
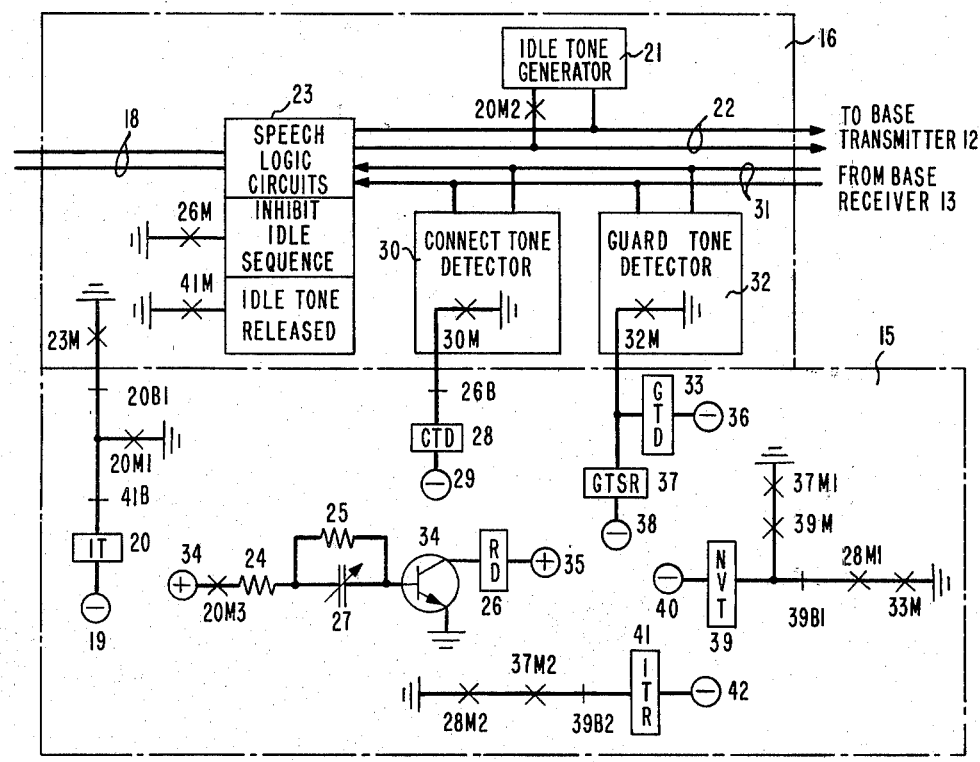
FIG. 2 is a schematic diagram of portions of a system base station utilizing the invention.

FIG. 2 is a simplified schematic diagram of the relevant parts of the tone generating and detecting portions of the control terminal 16. Also shown is the connect tone detection output blocking logic 15 for randomizing shared channel access attempts. Full details of the base station and control terminal are not provided, since they comprise no part of the present invention and are well known in the art as evidenced, for example, by the aforementioned Herrick patent.

Included in control terminal 16 are circuits which put an idle tone of predetermined frequency on the user-shared communication channel whenever it is idle. This is represented by a set of normally open contacts 23M, sometimes otherwise designated ITC for idle tone control. Those contacts are controlled by a relay operating coil located in the control terminal speech and logic circuits 23 and not otherwise specifically shown in FIG. 2. Circuits 23 include known circuits for performing such functions as operation sequencing control, two-wire/four-wire conversions, and speech signal level control.

Operating battery connections are represented schematically in FIG. 2 by circled polarity signs indicating connection of an associated lead to a battery terminal of the indicated polarity and which battery has its opposite terminal connected to ground.

The schematic diagram of FIG. 2 is shown in electromagnetic relay form because many systems currently in commercial radiotelephone service and using shared-access channels are implemented in relay format. However, it is obvious that other logical control technologies are applicable. Relays in FIG. 2 are represented in the detached contact schematic type of arrangement in order to introduce a minimum of drawing complexity. In that type of arrangement, normally open relay contacts, i.e., those which are open when the corresponding relay operating coil is not fully energized to a predetermined level, are shown by an X mark across the lead in which the contacts are electrically located. Similarly, normally closed contacts, i.e., those which are closed in the absence of energization of the corresponding operating coil, are shown by a perpendicular line across the lead in which the contacts are electrically connected. The relay operating coil controlling any set of contacts is located in the drawing where it is most convenient from a drafting standpoint, and the controlled contacts are similarly located in the drawing where it is most convenient for drafting purposes. In FIG. 2, a relay operating coil is referenced by a numerical reference character. Any set of contacts operated by a particular operating coil is designated by the same reference character followed by either the letter M for normally open, or make, contacts or the letter B for normally closed, or break, contacts. If more than one set of the same type of contacts is associated with a particular operating coil, the contacts' letter M or B, as the case may be, is further followed by a distinguishing numeral.

Before proceeding further with the description of FIG. 2, it is noted that FIGS. 3-4 are time sequence diagrams representing operations of the base station 14, the instant mobile unit 11, and the random mobile unit 10, respectively, in making so-called mobile-to-land call attempts in which the attempts are essentially simultaneously initiated for the two mobile units. In the case of the random mobile unit 10, it is assumed that the attempt illustrated is the first after an attempt in which no idle tone was detected. Solid-line portions of the diagrams in those three figures represent the prior art mode of operation, some of which is common to operation in accordance with the present invention. Modifications in the operation caused by the present invention are illustratively indicated by broken-line portions of the diagrams.

In FIG. 2, when the logic circuits 23 of control terminal 16 cause the idle tone control contacts 23M to close, a circuit is established between a negative potential terminal 19 and ground through the contacts 23M for energizing an operating coil 20 of an idle tone relay. Energization of the relay coil 20 in this fashion operates the corresponding contacts and, thereby, closes the make contacts 20M1, and opens the break contacts 20B1, which are advantageously associated with the contacts 20M1 in a make-before-break relationship. This establishes a holding current path for the relay coil 20 through the break contacts 41B and the make contacts 20M1 to ground. An additional set of make contacts 20M2 are included in an output lead of an idle tone generator 21; and upon closure of those contacts, the output of the idle tone generator is placed across a two-wire circuit 22 extending between speech and logic circuits 23 of the control terminal and the base station transmitter 12 for the shared-access channel. Thus, the broadcast of idle tone on the shared channel is initiated as indicated at time $t_0$ in the left-hand portion of FIG. 3.

Another set of make contacts 20M3 is included in a circuit for applying positive battery 34 to a series combination of a random delay relay RD operating coil 26 and a variable delay device, to be described, including an adjustable capacitor 27. Capacitor 27 schematically represents the facility for variably selecting a time delay $\tau_{RD}$ between the initiation of idle tone transmission and a time when control terminal 16 first becomes adequately responsive to detect an access-requesting signal, in the form of connect tone, from a mobile unit. The extent of this random delay is adjustable either manually by a terminal attendant or automatically by appropriate, e.g., electronic circuits determining a particular sequence of operation, or by software control exercised by a central processing unit (not shown) which may be associated with either control terminal 16 or the dial central office 19. Thus, the variation of the random delay is advantageously implemented, either on a regularly scheduled basis or at irregular times, as may be appropriate to system requirements. Likewise, the delay is variable in response to the monitoring, at the dial central office or at the control terminal, of traffic volume on the shared channel or of the time of day.

A presently preferred delay device circuit for manual operation is illustrated and includes a series resistor 24, a resistor 25 in parallel with capacitor 27, and an npn transistor 34. When contacts 20M3 close, capacitor 27 begins to charge from a positive battery 35 through resistor 24 and the internal base-emitter path of transistor 34. This causes the transistor to conduct in its collector-emitter path and energize the random delay relay coil 26. After a time determined primarily by the time constant of resistor 24 and capacitor 27 (since resistor 25 advantageously has a much larger resistance than resistor 24), capacitor 27 becomes fully charged. Base current for transistor 34 is then determined by the series combination resistance of resistors 24 and 25; and that resistance is selected to make collector current then flowing in transistor 34 insufficient to sustain holding current in coil 26, so the delay relay is released. The time delay $\tau_{RD}$ between pick up and release of that relay is longer than the guard-connect access tone program of a mobile unit and may be as long as, e.g., several seconds, if system needs so dictate. However, the delay must be short enough to prevent undue delay of subscriber mobile unit attempts to seize the channel. Capacitor 27 discharges through resistor 25 after contacts 20M3 have been reopened.

A typical mobile unit access tone program includes 350 milliseconds of guard tone followed by 50 milliseconds of connect tone, as illustrated in FIG. 4. A similar tone program sequence is shown in FIG. 5 for the random unit 10, but the sequence does not begin until the expiration of a random time interval $\tau_r$, the duration of which is determined by processing circuits in the mobile unit as hereinbefore outlined.

Energization of relay coil 26 opens a set of random delay break contacts 26B in a circuit for energizing a connect tone detector relay coil 28. That prevents utilization of the output of a connect tone detector 30. In systems with plural shared-access channels, make contacts 26M are closed to apply ground to inhibit idle tone transfer among channels by logic circuits 23. Upon expiration of the random delay $\tau_{RD}$, coil 26 is deenergized; and the corresponding relay drops out. Contacts 26B are closed once more to enable the application of operating current to the coil 28 from a negative potential source 29. Such energization normally does not take place immediately because the energizing circuit includes normally open contacts of connect tone detector 30 and designated 30M. These contacts are operated as part of a relay (not otherwise shown) responsive to the output of connect tone band selection circuits in the detector. Contacts 30M remain in their normal open status until the base station receiver 13 receives connect tone and applies that tone to a two-wire circuit 31 extending to the speech and logic circuits 23 and across which detector 30 is connected.

A guard tone detector 32 is also connected across the circuit 31 and advantageously includes bandpass filter circuits responsive to the guard tone frequency for energizing a relay (not shown) to actuate normally open make contacts 32M. Closure of those contacts applies ground to energizing circuits for a guard tone detector relay operating coil 33 from a negative supply 36 and for a guard tone slow release relay coil 37 from a further negative supply 38.

Guard tone detector relay coil 33 is associated with make contacts 33M in the operating circuit for the coil of a nonvalid tone relay coil 39. The same circuit includes make contacts 28M1 associated with the connect tone detector relay coil 28. These two sets of contacts are provided to detect an invalid simultaneous transmission of guard tone and connect tone and, thereby, energize the nonvalid transmission relay coil 39 from a negative source 40. That coil is associated with a make-before-break transfer contact pair including make contacts 39M and break contacts 39B1 to establish a holding current path for coil 39. That path also includes make contacts 37M1 of the guard tone slow release relay coil 37 to maintain the holding path beyond the end of detected guard tone. Additional break contacts 39B2 are included in the energizing circuit for an idle tone release relay coil 41, so that upon detection of the invalid tone combination, idle tone cannot be discontinued.

Two pairs of make contacts 28M2 and 37M2 are also included in series in the circuit for energizing the operating coil of the idle tone release relay 41 from a negative supply 42. The guard tone slow release make contacts 37M2 are provided to maintain enablement of energization of the coil 41 during the time that a mobile unit tone program changes from transmission of guard tone to transmission of connect tone. This also assures energization of coil 41 in response to sequential reception of guard tone and connect tone. Thus, the guard tone slow release relay and its coil 37 must have a slow release characteristic sufficient to maintain the contacts 37M2 closed long enough to assure that when relay contacts 28M2 close, coil 41 will be energized long enough for coil 20 to be deenergized by opening of contacts 41B. Contacts 37M1 hold coil 39 energized; and thus holding contacts 39B2 open, to prevent energization of coil 41 in the presence of an invalid tone combination.

Upon the proper reception of connect tone by detector 30, contacts 30M are closed, relay coil 28 is energized, and contacts 28M2 and 37M2 are both in their closed states to energize coil 41. The energization of that coil opens break contacts 41B in the energizing and holding current path for idle tone relay coil 20, and contacts of that relay are restored to their normal states. Consequently, the contacts 20M2 in the output of idle tone generator 21 are opened; and idle tone transmission is terminated, as indicated at the end of the broken-line portion of the diagram in FIG. 3. Similarly, make contacts 41M are closed to provide a ground for informing speech and logic circuits 23 that idle tone has been released. This causes any contending mobile units which were monitoring idle tone on the shared channel either to turn off their transmitters or to retune to a different frequency. That leaves tuned to the shared channel any one or more mobile units which had, at the termination of idle tone, been engaged in the transmission of connect tone.

Any last-mentioned mobile unit still tuned to the shared-access channel at the termination of idle tone remains so tuned to await reception of a seize tone transmitted from the base station as indicated in FIG. 3. Such mobile unit waits 190 milliseconds after the termination of seize tone and then transmits its automatic number identification (ANI). If, at that time, more than one mobile unit transmits its ANI sequence, and both signals are received by the control terminal 16, the results are perceived as an invalid garbled message; and the seizure attempts for all units are aborted. However, if a valid ANI message is received, the control terminal allows the process to continue; and the mobile unit user dials the number of the called party to obtain the connection of the desired call, when then progresses in the usual manner.

It can be seen from FIG. 4 that the instant mobile unit 11 detected idle tone as soon as it began, and immediately initiated the channel access sequence. However, the resulting access tone program ended following the 50 milliseconds of connect tone at a time shown in FIG. 3 when the control terminal was still nonresponsive. Consequently, at the end of the program, the mobile unit 11 still receives idle tone, and that is recognized as an unsuccessful seizure attempt. The unit recycles to initiate its access tone program once again. However, in the time required for it to run through that program once more, the random mobile unit 10 has completed its initially delayed tone program and found that during its connect tone interval, the control terminal apparently successfully detected the connect tone and released idle tone. Thus, the mobile unit 10 is the only one which can respond to seize tone. Usually in idle channel marked systems, a mobile unit that detects loss of idle tone reception during the guard tone portion of its access program immediately ends the attempt to access the channel on the assumption that another mobile unit seized the channel.

FIGS. 3–5 illustrate an operational sequence in which, for convenience of description, it is assumed that a single shared-access channel first becomes available at the same time $t_0$ that the users of the random mobile unit 10 and the instant mobile unit 11 both seek to initiate an outgoing call. In that situation, the relays of coils 20 and 26 operate; and the output of connect tone detector 30 is disabled. Instant mobile unit 11 sends guard tone, and relays of coils 33 and 37 in the logic 15 are operated. Random mobile unit 10 starts its selected random delay $\tau_r$. At time $t_1$, mobile unit 10 has timed out that random delay and begins sending guard tone. At time $t_2$, instant mobile unit 11 ends its guard tone transmission interval and begins sending connect tone.

At time $t_3$, prior art systems would have caused the control terminal to detect the connect tone and end the transmission of idle tone from the base station. However, in the illustrative embodiment of the present invention, relay coil 26 remains energized; and control terminal 16 remains nonresponsive to connect tone until the expiration of the variable time delay $\tau_{RD}$ at time $t_7$. Consequently, at time $t_4$, when instant mobile unit 11 ceases to transmit connect tone, it still is able to detect idle tone. Its automatic channel seizing circuits cause it to initiate a new attempt by beginning the transmission of guard tone once more at time $t_5$. The interval between $t_4$ and $t_5$ is a function of how long it takes the user of the instant mobile unit to initiate the sequence of turning off the transmitter, detecting idle tone, and reaccessing the channel.

At time $t_6$, random mobile unit 10 ends its guard tone transmission interval and begins sending connect tone. Both guard tone and connect tone are then being transmitted when considering units 10 and 11 together. However, the frequency modulation capture effect usually allows the modulation of only one mobile unit's transmission to be detected, i.e., that one received with greatest signal strength. Thus, relay 39 does not pick up. It is assumed for purpose of the present example that the signal of random unit 10 is the stronger at base station 14.

As previously noted, at the time $t_7$ the variable delay $\tau_{RD}$ expires; and the relay of coil 26 drops out, thereby enabling the output of connect tone detector 30. This allows relay coil 28 to pick up in response to connect tone from unit 10, and relay 41 also picks up as a result. Consequently, relay 20 drops out, idle tone generator 21 is disconnected from the circuit 22, and idle tone transmission is ended. Instant mobile unit 11, which had been sending guard tone, detects the loss of idle tone at time $t_8$ and automatically transfers itself to its standby condition with its transmitter off. This action causes the user of mobile unit 11 to reinitiate the same call.

At time $t_9$, random mobile unit 10 ends its connect tone transmission interval, during which time it had detected the absence of idle tone being transmitted from the base station. The unit then automatically resumes transmission of guard tone while awaiting reception of seize tone, beginning at time $t_{10}$, from the base station. Upon receiving seize tone, the random mobile unit 10 prepares to send its ANI signals; and at time $t_{11}$, begins sending those signals. Thereafter, the call initiated by random mobile unit 10 is set up and progresses in the usual way.

If one compares FIGS. 4 and 5 at the time $t_{11}$, it is apparent that, in prior systems, the instant mobile unit 11 controlled channel seizure and was able to establish its call connection, as shown by the solid-line ANI transmission interval after time $t_{11}$ in FIG. 4. However, with the modifications of the present invention, the same initial situation at time $t_0$ caused the instant mobile unit 11 to fail on its first seizure attempt and make a second seizure attempt, starting at time $t_5$. That left open the opportunity for the random mobile unit 10 to seize the channel and start its call-up procedure at time $t_{11}$ instead of mobile unit 11 starting at that time. It will be apparent to those skilled in the art that there are many variations on the situation just described with reference to FIGS. 3–5. The results in those variations will depend upon factors such as when each mobile unit user begins a call attempt, the duration of the random delay $\tau_{RD}$ in the control terminal, and the duration of the selected random delay $\tau_r$ in any contesting mobile unit having a random delay algorithm for channel seizure.

Although the present invention has been described in connection with a particular embodiment thereof, it will be apparent to those skilled in the art that additional applications, embodiments, and modifications, which will be obvious to those skilled in the art are included within the spirit and scope of the invention.

What is claimed is:

1. A method for forcing randomization of access to a shared communication channel on which a signal is transmitted to indicate availability of the channel for message transmission, the channel extending between a first station supplying such tone and at least one further station, and the method comprising the steps of applying said availability signal to the channel at said first station at the onset of availability of said channel for message transmission, receiving at said first station a predetermined set of access-requesting signals from said further station, and inhibiting response by said first station to said access-requesting signals during an interval of randomly selectable duration following onset of said availability.

2. In a communication system including at least one user-shared-access communication channel and a first station for controlling the access of multiple, remotely located users to that channel by applying to said channel a signal indicating the availability thereof for access by a user, and wherein user station equipment seeking access initiates a predetermined program of access-requesting signals, and, if thereafter the availability signal is still present on the channel, said equipment reinitiates said program at least once, said first station comprising means for receiving from said channel an access-request signal indicating that a user is requesting access to said channel, means, responsive to said access-request signal, for removing from said channel said availability signal, and means for inhibiting the response of said removing means to an access-request signal for a time interval of randomly selectable duration, at least as long as said program, after initial application of said availability signal.

3. The communication system in accordance with claim 2 in which said system is a radiotelephone system in which said first station is a geographically fixed base station, said user equipment is a mobile radiotelephone unit, and said channel is a radio channel, said base station includes means for applying to said channel an idle channel marking tone as said channel availability signal, and said receiving means includes means for detecting in said program of access-requesting signals a first interval of guard tone to alert said base station that a user is seeking access to said channel and a following interval of connect tone to activate said removing means.

4. The communication system in accordance with claim 3 in which said base station inhibiting means comprises means for measuring said selectable time interval, and means, responsive to an output of said measuring means, for enabling said removing means.

5. The communication system in accordance with claim 2 in which said base station includes an idle tone generator for supplying idle tone to said channel as said availability signal, means, in said access-request signal receiving means, for detecting a predetermined tone of said program, and said inhibiting means includes means for disabling an output of said tone detecting means in coincidence with the initiation of an output from said idle tone generator, and means for terminating operation of said disabling means upon expiration of said interval.

6. The communication system in accordance with claim 2 in which said access-request signal has a predetermined valid composition, means are provided for detecting at least one invalid access-request signal composition, and means, responsive to an invalid access-request signal composition, are provided for disabling said removing means.

* * * * *

UNITED STATES PATENT AND TRADEMARK OFFICE
CERTIFICATE OF CORRECTION

PATENT NO. : 4,395,594

DATED : July 26, 1983

INVENTOR(S) : John A. Meyerle

It is certified that error appears in the above—identified patent and that said Letters Patent is hereby corrected as shown below:

On the patent cover sheet, line [73], change the assignee from "Bell Telephone Laboratories, Incorporated, Murray Hill, N.J." to --American Telephone and Telegraph Company, New York, N.Y.--.

Signed and Sealed this

Twenty-fourth Day of July 1984

[SEAL]

*Attest:*

GERALD J. MOSSINGHOFF

*Attesting Officer*   *Commissioner of Patents and Trademarks*